(12) United States Patent
Ku et al.

(10) Patent No.: US 8,717,281 B2
(45) Date of Patent: May 6, 2014

(54) ELECTROFLUIDIC DEVICE AND OPERATION METHOD THEREOF

(75) Inventors: Yun-Sheng Ku, Miaoli County (TW); Wei-Yuan Cheng, New Taipei (TW); Pei-Ju Su, Hsinchu (TW); Shu-Wei Kuo, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/072,779

(22) Filed: Mar. 28, 2011

(65) Prior Publication Data

US 2012/0146984 A1    Jun. 14, 2012

(30) Foreign Application Priority Data

Dec. 13, 2010  (TW) .............................. 99143520 A (51) Int. Cl.
*G09G 3/34*    (2006.01)
(52) U.S. Cl.
USPC ........ 345/107; 359/290; 359/296; 422/82.01; 422/100; 436/149; 436/150; 345/84; 345/204
(58) Field of Classification Search
USPC .................... 345/107, 84, 204; 204/600–604, 204/643–645; 422/82.01, 100; 436/149–150; 359/290, 296
See application file for complete search history.

(56) References Cited

U.S. PATENT DOCUMENTS

| | | | |
|---|---|---|---|
| 7,163,612 B2 | 1/2007 | Sterling et al. | |
| 7,724,419 B1 * | 5/2010 | Fan et al. | 359/296 |
| 8,194,304 B2 * | 6/2012 | Niwano et al. | 359/296 |
| 2005/0111842 A1 | 5/2005 | Nakagawa | |
| 2008/0093220 A1 | 4/2008 | Cernasov et al. | |
| 2009/0059348 A1 | 3/2009 | Niwano et al. | |

FOREIGN PATENT DOCUMENTS

| | | | |
|---|---|---|---|
| CN | 101900878 | 12/2010 | |
| TW | 200911375 | 3/2009 | |
| TW | 200933192 | 8/2009 | |
| WO | WO2006129846 | * 12/2006 | 359/296 |
| WO | 2009036272 | 3/2009 | |

OTHER PUBLICATIONS

Hekenfeld et al., "Electrofluidic displays using Young-Laplace transposition of brilliant pigment dispersions", Nature photonics, Apr. 26, 2009, pp. 1-5.
Song et al., "A scaling model for electrowetting-on-dielectric microfluidic actuators", Microfluidics Nanofluidics Research Report, Nov. 12, 2008, pp. 75-89.

(Continued)

*Primary Examiner* — Lin-Yi Lao
*Assistant Examiner* — Insa Sadio
(74) *Attorney, Agent, or Firm* — Jianq Chyun IP Office (57) ABSTRACT

An electrofluidic device includes first structural layer and second structural layer. First structural layer includes first substrate; and first electrode and second electrode on the first substrate. The second electrode has an indent region surrounding and without contacting first electrode. First hydrophobic layer is at least over the second electrode. Second structural layer at one side of the first structural layer with a gap includes second substrate and groove structure layer. The groove structure layer includes an indent groove, corresponding to the indent region of the second electrode. Second hydrophobic layer is over the groove structure layer. Polar fluid is disposed in the indent groove and remains in contact with the first electrode. Non-polar fluid is disposed in the gap between the first and second structural layers.

23 Claims, 9 Drawing Sheets

(56) References Cited

OTHER PUBLICATIONS

R. B. Fair, "Digital microfluidics: is a true lab-on-a-chip possible?", Microfluidics Nanofluidics Review, Mar. 8, 2007, pp. 245-281.

Kuo et al., "Single layer multi-color electrowetting display by using ink jet printing technology and fluid motion prediction with simulation", 2010 SID, May 23, 2010, 939-942.

"Office Action of Taiwan Counterpart Application", issued on Apr. 26, 2013, p. 1-p. 3.

* cited by examiner

ELECTROFLUIDIC DEVICE AND OPERATION METHOD THEREOF

CROSS-REFERENCE TO RELATED APPLICATION

This application claims the priority benefit of Taiwan application serial no. 99143520, filed Dec. 13, 2010. The entirety of the above-mentioned patent application is hereby incorporated by reference herein and made a part of this specification.

TECHNICAL FIELD

The disclosure relates to electrofluidic display technology. More particularly, the present invention relates to electrofluidic device and the operation method thereof.

BACKGROUND

The electrofluidic device is driven based on the change of the interface between polar fluid and non-polar fluid by applying electric field thereon.

Figure 1A:
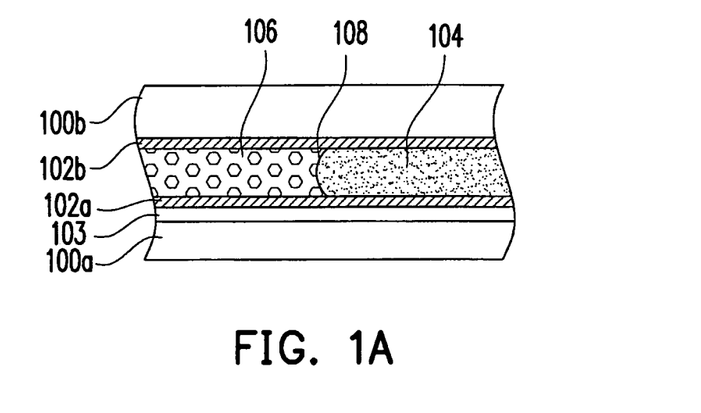
FIGS. 1A-1B are drawings, schematically illustrating the driving mechanism of the conventional electrofluidic device.
Figure 1B:
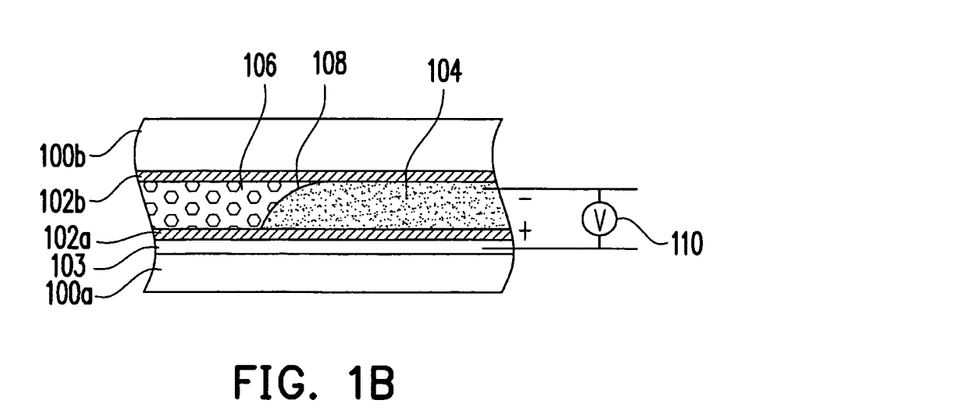

FIGS. 1A-1B are drawings, schematically illustrating the driving mechanism of the conventional electrofluidic device. In FIG. 1A, the polar fluid 104 and non-polar fluid 106 are filled between two transparent substrate 100a, 100b and form an interface 108. Polar fluid 104 can be water containing pigment or colorant for an example. The non-polar fluid 106 can be transparent oil for an example. The hydrophobic layers 102a, 102b are disposed on the two substrates 100a, 100b in contact with the polar fluid 104 and the non-polar fluid to form a convex-shape polar fluid. An electrode layer 103 is further disposed between the substrate 100a and the hydrophobic layer 102a. A the state without applying operation voltages, the polar fluid 104 is converged due to the surface tension at the hydrophobic layers.

In FIG. 1B, when the polar fluid 104 is treated as the ground terminal and the electrode layer 103 is applied with a voltage 110, the interface 108 is changed as a slant due to the effect of electric field, and the polar fluid 104 is driven to shifting toward the left. The area covered by the polar fluid 104 displays the colors, which is the color of pigment or colorant carried by the polar fluid.

Figure 2A:
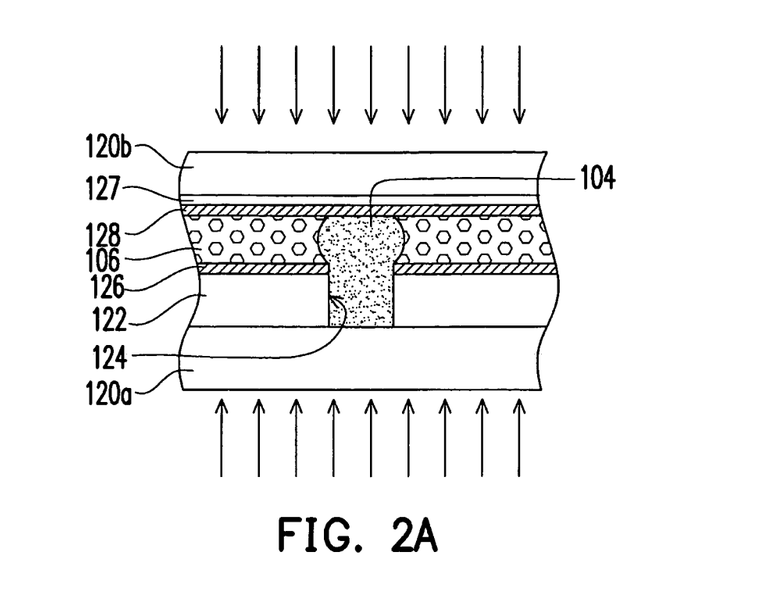
FIGS. 2A-2B are cross-sectional views, schematically illustrating a conventional structure of electrofluidic device.
Figure 2B:
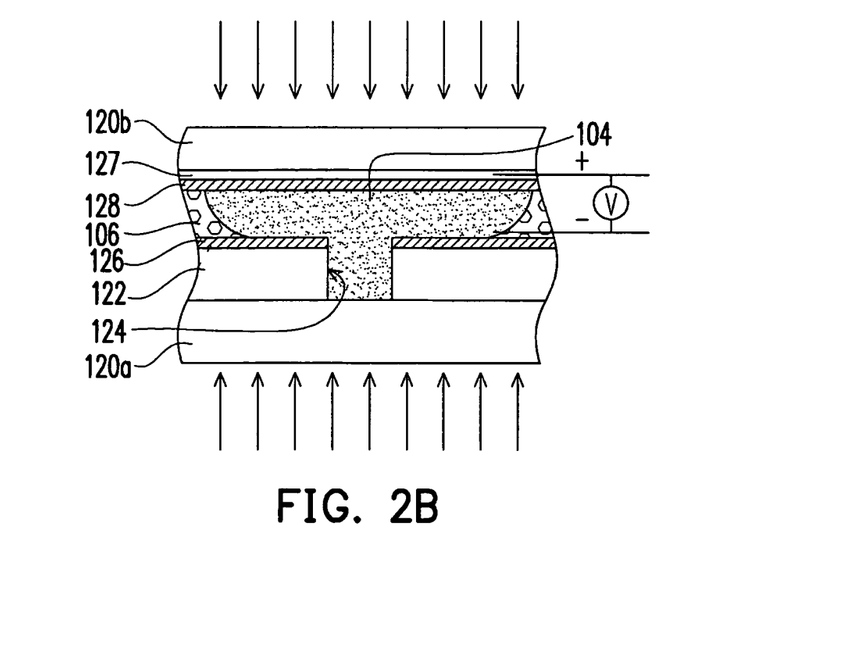

Based on the foregoing mechanism, it can be used to design the display device. FIGS. 2A-2B are cross-sectional views, schematically illustrating a conventional structure of electrofluidic device. In FIG. 2A, an insulating layer 122 is disposed a transparent substrate 120a. The insulating layer 122 has a groove 124. A hydrophobic layer 126 is disposed on the insulating layer 122. An electrode layer 127 and a hydrophobic layer 128 are disposed on another substrate 120b. The electrode layer 127 is transparent conductive material, such as indium tin oxide (ITO). The polar fluid 104 is disposed in the groove 124 and between the hydrophobic layers 126 and 128. The non-polar fluid 106 is disposed between the hydrophobic layers 126 and 128 and form a balancing interface with the non-polar fluid 104, such as water, which can be dyed with pigment or colorant. The non-polar fluid 106 is transparent fluid, such as oil. When no voltage is applied, due to the effect of surface tension at the hydrophobic layer, the polar fluid 104 is converged in the groove 124. The substrate is also transparent. When the light enters, the light maintains the original color, such as white, of the light, and transmits the substrates 120a, 120b, the electrode layer 127 and the transparent non-polar fluid 106.

In FIG. 2B, when the polar fluid 104 is treated as the ground and the electrode layer is applied with a positive voltage, the polar fluid 104 is driven out from the groove 124 and shifted outward to the area other than the groove 124. Since the polar fluid 104 has the pigment or colorant, the transmitting light through the polar fluid 104 appears the color of the pigment or colorant. When the voltage stops, due to the effect between the polar fluid 104 and the hydrophobic layer, the polar fluid 104 is pulled back to the groove 124.

Figure 3A:
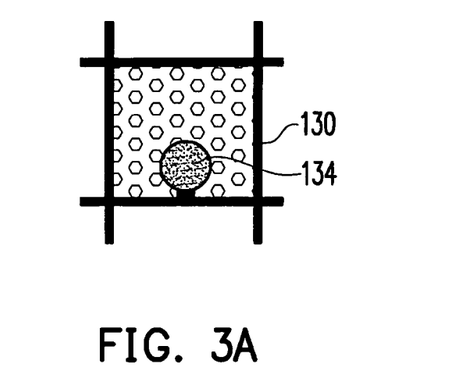
FIGS. 3A-3B are drawing, schematically illustrating the operation mechanism of the electrofluidic display panel.
Figure 3B:
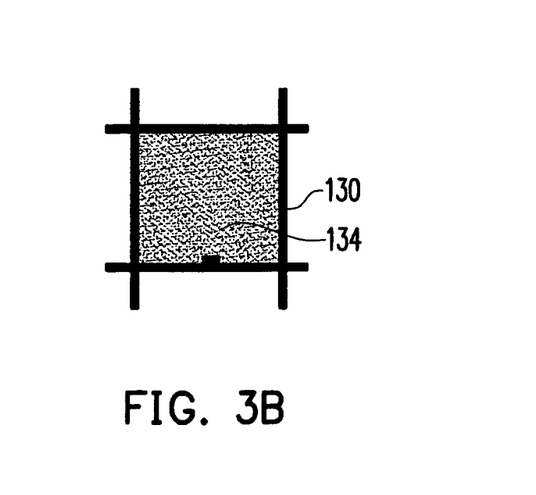

The conventional electrofluidic display panel is composed of multiple electrofluidic devices, which are arranged in an array form. FIGS. 3A-3B are drawing, schematically illustrating the operation mechanism of the electrofluidic display panel. In FIG. 3A, each pixel has the polar fluid disposed in the groove and the peripheral region of the groove is filled with the non-polar fluid. The periphery of the pixel has the duct 130. The duct 130 is also filled with the non-polar fluid and can isolate the operation of each pixel when the polar fluid is driven. When there is no operation voltage applied, the polar fluid 134 remains in the groove. In FIG. 3B, when the operation voltage is applied, the polar fluid 134 is pulled out from the groove and extends to cover the whole pixel area. Since the polar fluid is dyed with pigment or colorant, the color displaying effect can be achieved. The duct 130 can avoid the interference between the polar fluids in different pixels when operation is performed.

SUMMARY

In an embodiment of disclosure, an electrofluidic device includes a first structural layer, a second structural layer, a polar fluid and a non-polar fluid. The first structural layer include a first substrate; a first electrode disposed on the first substrate; a second electrode disposed on the first substrate, wherein the second electrode has a indent region surrounding the first electrode without contact; and a first hydrophobic layer at least disposed on the second electrode. The second structural layer is located at one side of the first structural layer and separate by a gap. The second structural layer includes a second substrate; a groove structure layer on the second substrate having an indent groove corresponding to the indent region of the second electrode; and a second hydrophobic layer on the groove structure layer. The polar fluid is disposed in the indent groove and is remaining contact with the first electrode. The non-polar fluid is disposed in the gap between the first structure layer and the second structure layer and forms a fluid interface with the polar fluid.

In an embodiment of the disclosure, an electrofluidic display panel is provided. The electrofluidic display panel includes a plurality of the electrofluidic devices to form an array for displaying a predetermined display area. Each electrofluidic device is controlled to display a color.

In an embodiment of the disclosure, an operation method for electrofluidic device is provided, in which the structure of the electrofluidic device may be the foregoing structure. A third electrode can also be disposed over the groove structure layer. The operation method includes applying a ground voltage to the first electrode. A first voltage signal is applied to the second electrode, in which the first voltage signal is alternatively changing between a first positive voltage and a first negative voltage by a frequency. A second voltage signal is applied to the third electrode. The second voltage signal is alternatively changing between a second positive voltage and a second negative voltage by the same frequency.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF DISCLOSED EMBODIMENTS

Several embodiments are provided for describing the structure and operation manner for the electrofluidic device. However, the disclosure is not just limited to the embodiments. In addition, the embodiments may have a proper combination therebetween.

In an embodiment, the electrofluidic device is formed with two structure layers with a gap therebetween. A polar fluid is localized at a small area within the gap and is surrounded by non-polar fluid. An interface is formed between the polar fluid and the non-polar fluid. Electrode structures are formed on the structure layers and are used to drive a movement of the polar fluid. Since multiple electrode structures are disposed, the polar fluid can remain in contact with the ground voltage. The operation speed is improved. The driving voltage can be reduced. The issue of charge accumulation can also be solved.

Figure 4:
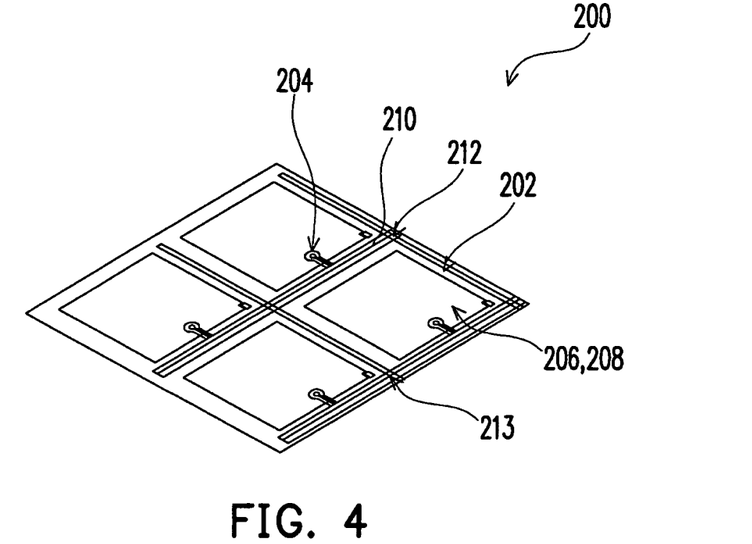
FIG. 4 is a drawing, schematically illustrating a structure layer of electrofluidic device, according to an embodiment of disclosure.

FIG. 4 is a drawing, schematically illustrating a structure layer of electrofluidic device, according to an embodiment of disclosure. In FIG. 4, the two structure layers of the electrofluidic device are also referred to a first structure layer and a second structure layer. In an embodiment, the first structure layer 200 can include a first substrate 202. The first substrate 202 serves a structure base can be formed by transparent material, for example. A first electrode 204 is disposed on the first substrate 202. The first electrode 204 is electrically connected to a conductive line 210 on the first substrate 202, for connecting to a external control circuit and then constantly providing a ground voltage. The second electrode 206 is disposed on the first substrate 202. The second electrode 206 is corresponding to the display pixel and can be transparent material, for example. The second electrode 206 has an indent region surrounding the first electrode 204 without contact. A first hydrophobic layer 208 is at least disposed on the second electrode 206, and can be even disposed on a region other than the second electrode 206. The second electrode 206 can be a patterned electrode layer in an example.

Figure 9:
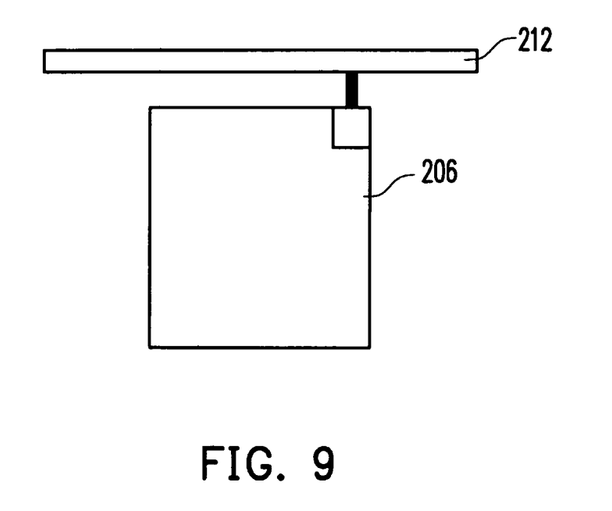
FIG. 9 is a drawing, schematically illustrating the mechanism of the second electrode of the electrofluidic device under operation.

The second electrode 206 can be directly and electrically connected to a conductive structure, as to be described in FIG. 9. Further, the second electrode 206 can also be a switching structure, such as a switching control structure based on thin film transistor (TFT) as to be described in FIG. 10. The operation voltages can be input from the conductive line 212 in an example. If the second electrode 206 is under switch control, it is controlled by the conductive line 212, and another conductive line 213 is used to control the conduction of the switch.

Figure 5:
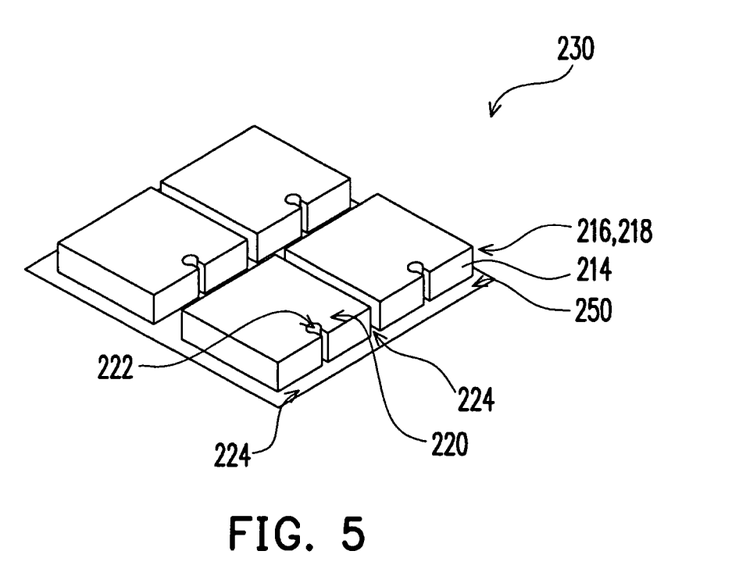
FIG. 5 is a drawing, schematically illustrating another structure layer of electrofluidic device, according to an embodiment of disclosure.

FIG. 5 is a drawing, schematically illustrating another structure layer of electrofluidic device, according to an embodiment of disclosure. In FIG. 5, the structure layer can be the second structure layer 230, used to form the groove structure layer, and may also provide a third electrode.

The second substrate 250 can also be a transparent material and is used as the base structure of the structure layer. The groove structure layer 214 is disposed on the second substrate 250. The groove structure layer 214 can also be transparent material, allowing the light to pass. The groove structure layer 214 has an indent groove 222, corresponding to the indent region of the second electrode 206 in FIG. 4. Another hydrophobic layer 220 is formed over the groove structure layer 214. The groove structure layer 214 under the hydrophobic layer 220 can also have a third electrode layer 216 and a dielectric layer 218. Likewise, a dielectric layer can also be formed between the second electric layer 206 and the hydrophobic layer 208 in FIG. 4 as actually need. The periphery of the groove structure layer 214 has the duct structure. The operation mechanism is to be described in FIG. 6.

Figure 6:
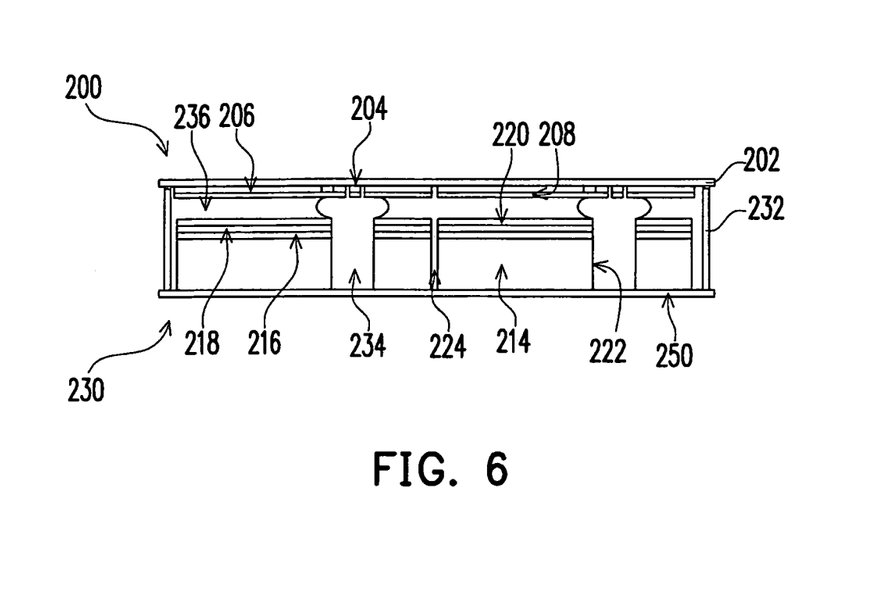
FIG. 6 is cross-sectional drawing, schematically illustrating the structure of electrofluidic device, according to an embodiment of disclosure.

FIG. 6 is cross-sectional drawing, schematically illustrating the structure of electrofluidic device, according to an embodiment of disclosure. In FIG. 6, according to the two structure layers in FIG. 4 and FIG. 5, a sidewall 232 is used to stack as an electrofluidic device. The indent groove 222 is disposed with the polar fluid 234 and the other space of the gap is disposed with non-polar fluid 236, which forms an interface with the polar fluid 234. The e polar fluid 234 between the two hydrophobic layers 208 and 220 has variable contact area, which is depending on the applied voltage on the second electrode 206 to be able to at least extend over the second electrode 206. In other words, by using a thickness of the groove structure layer and the aperture of the indent groove 222, the indent groove can have a space to contain a sufficient amount of the polar fluid. When the polar fluid is driven out to the gap, it can fully extend to the whole gap. In addition, since the adjacent pixels are operated together, the polar fluid 234 can extend the full gap. When the second electrode 206 is not applied, the polar fluid 234 is pulled back to the indent groove 222 due to the effect of the first hydrophobic layer 208 and the second hydrophobic layer 220. The movement of the fluid can be maintained by the duct 224 between the pixels.

Remarkably, the first electrode 204 is located over the polar fluid 234, and can remain a contact with the polar fluid 234. The first electrode 204 is at the ground voltage, so that the device can be actively driven, the driving voltage can be reduced, and the issue of charge accumulation can be avoided. As a result, the operation speed can be improved.

In addition, an electrode layer 216 can also be formed on the groove structure layer 214 for auxiliary driving. The manner to form the electrode layer 216 can be forming an electrode layer 216 on the groove structure layer 214 in an example. After then, a dielectric layer 218 is formed thereon. In accordance with the electrode layer 216 for driving, it can be achieved that the polar fluid can be driven by two sides.

Figure 7:
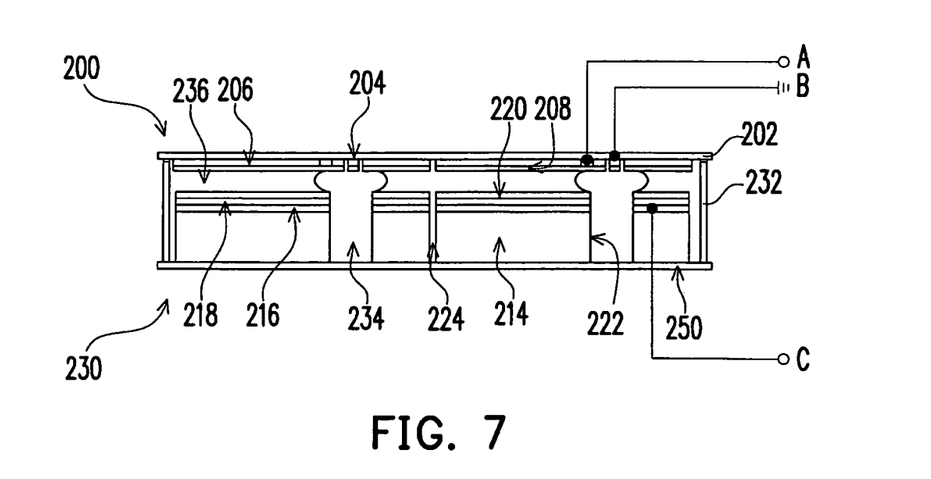
FIG. 7 is cross-sectional drawing, schematically illustrating the operation mechanism for the structure in FIG. 6, according to an embodiment of disclosure.

FIG. 7 is cross-sectional drawing, schematically illustrating the operation mechanism for the structure in FIG. 6, according to an embodiment of disclosure. In FIG. 7, the second electrode 206 is connected to the terminal A to apply an operation voltage. The first electrode 204 is connected to the terminal B and remains at the ground voltage. The electrode layer 216 is connected to the terminal C to apply another operation voltage. As a result, since both the second electrode 206 and the electrode layer 216 have the voltages, the pulling speed of the polar fluid 234 can be achieved by the diving force from the two sides. The operation speed can be improved.

Figure 8:
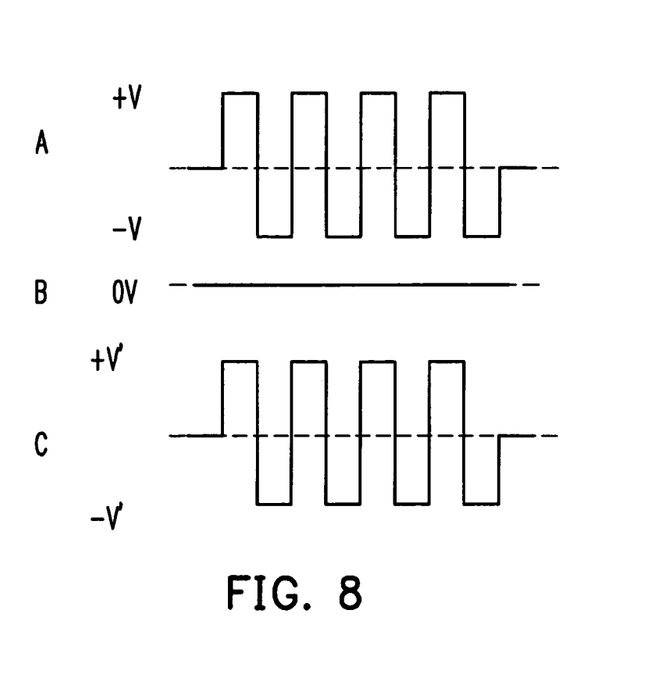
FIG. 8 is a drawing, schematically illustrating the operation voltage signals in FIG. 7, according to an embodiment of disclosure.

FIG. 8 is a drawing, schematically illustrating the operation voltage signals in FIG. 7, according to an embodiment of disclosure. In FIG. 8, the voltage applied to the terminal A is an alternative voltage signal between +V and −V, as an example. The terminal B remains at the ground voltage. The voltage applied at the terminal C is an alternative voltage signal between +V' and −V', as an example. The sequences of the positive/negative voltage at the terminal A and the terminal C are the same but the voltage level at terminal C can be slightly smaller than the voltage level at the terminal A. It can be auxiliary to drive the polar fluid 234. Since the polar fluid is contacting with the first electrode 204 and then is also remaining at the ground voltage of the circuit. As a result, because the polar fluid is conductive fluid, the positive/negative voltage for driving can cause the conductive fluid to be electrically neutral and then reducing the charge accumulation.

The structure of second electrode 206 is described. FIG. 9 is a drawing, schematically illustrating the mechanism of the second electrode of the electrofluidic device under operation. In FIG. 9, if the electrofluidic device is not driven by a switching mechanism to control each pixel, the second electrode 206 of the substrate 202 can be a simple interconnecting structure and the operation voltage signal at the terminal A of FIG. 8 can be input by the conductive line 212. The operation voltage can be directly applied to the second electrode 206.

Figure 10:
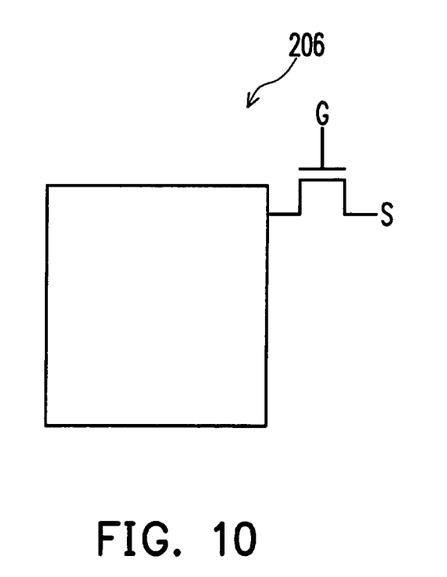
FIG. 10 is a drawing, schematically illustrating the second electrode of the electrofluidic device by TFT, according to an embodiment of disclosure.

If the electrofluidic device is not driven by a switching mechanism to control each pixel, the second electrode 206 can be the electrode structure with TFT. FIG. 10 is a drawing, schematically illustrating the second electrode of the electrofluidic device by TFT, according to an embodiment of disclosure. In FIG. 10, the second electrode 206 has a TFT switch, as an example. The TFT switch has a gate terminal G and source terminal S. The drain terminal is connected to the second electrode 206. The gate terminal G is a control terminal of the switch. When the TFT is conducted, the operation voltage can be input to the second electrode 206 from the source terminal S. The conductive line 212 is connected to the source terminal S to input the operation voltage while the gate terminal is input the switch control voltage by another conductive line 213 to turn on/off the TFT.

Figure 11:
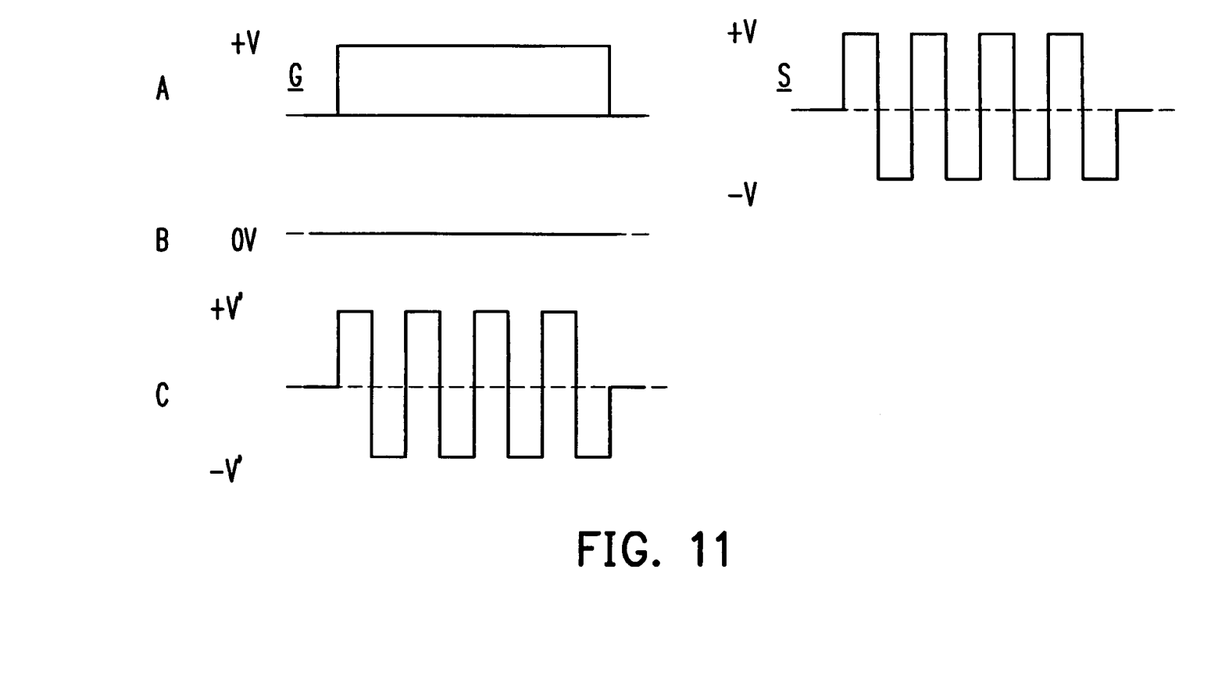
FIG. 11 is a drawing, schematically illustrating the operation voltage signals applied in the electrofluidic device of FIG. 7, according to an embodiment of disclosure.

FIG. 11 is a drawing, schematically illustrating the operation voltage signals applied in the electrofluidic device of FIG. 7, according to an embodiment of disclosure. In FIG. 11, the second electrode 206 in this embodiment is taking the N-type TFT switch as an example for control mechanism. The voltage at the terminal A needs a positive voltage to the gate terminal G to respectively conduct the TFT of pixel. The source terminal S is input with the alternative voltage signal. If the TFT is turned off, the alternative voltage signal cannot be input to the second electrode 206.

Based on the foregoing control manner, it can respectively control on/off for each pixel of the electrofluidic display panel. For a display area having multiple pixels, an effect of spatial gray level can be achieved by turning on a number of the pixels.

Figure 12:
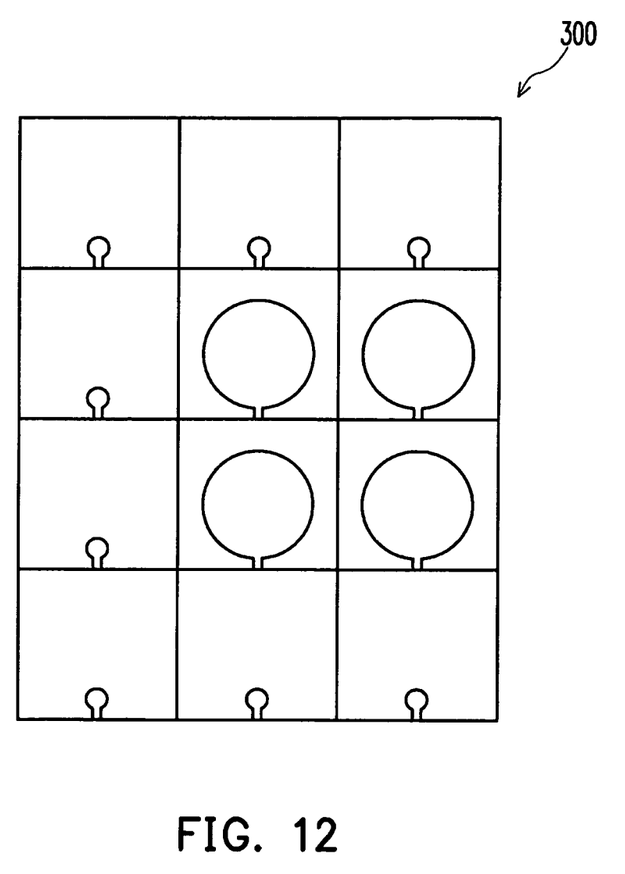
FIG. 12 is a drawing, schematically illustrating the operation manner of electrofluidic display panel, according to an embodiment of disclosure.

FIG. 12 is a drawing, schematically illustrating the operation manner of electrofluidic display panel, according to an embodiment of disclosure. In FIG. 12, the electrofluidic display panel 300 includes a plurality of pixels, of which the second electrode is a structure in FIG. 10 and controlled by the mechanism in FIG. 11. For a display area, just a portion of the pixels are turned on to achieve the effect of gray level. Generally, when the polar fluid is pulled out from the indent groove, it would extend the whole area of individual pixel and is incorporated with the adjacent t pixels. The number of the pixels being turned on determines the effect of gray level.

It will be apparent to those skilled in the art that various modifications and variations can be made to the structure of the disclosure without departing from the scope or spirit of the disclosure. In view of the foregoing descriptions, it is intended that the disclosure covers modifications and variations of the embodiments if they fall within the scope of the following claims and their equivalents.

What is claimed is:
1. An electrofluidic device, comprising:
   a first structure layer, comprising:
      a first substrate;
      a first electrode, disposed on the first substrate;
      a second electrode, disposed on the first substrate, wherein the second electrode has an indent region surrounding the first electrode without contact; and
      a first hydrophobic layer, disposed on the second electrode;
   a second structure layer, located at one side of the first structure layer, and separating by a gap, the second structure layer comprising:
      a second substrate;
      a groove structure layer, disposed on the second substrate, wherein the groove structure layer has an indent groove, corresponding to the indent region of the second electrode; and
      a second hydrophobic layer, disposed on the groove structure layer;
   a polar fluid, disposed in the indent groove and remaining a contact with the first electrode; and
   a non-polar fluid, disposed in the gap between the first structure layer and the second structure layer, and forming a fluid interface with the polar fluid.

2. The electrofluidic device of claim 1, wherein an area of the second electrode needs to extend into the indent groove of the second structure layer.

3. The electrofluidic device of claim 1, wherein a dielectric layer is disposed between the second electrode and the first hydrophobic layer.

4. The electrofluidic device of claim 1, wherein the second electrode is a patterned electrode layer.

5. The electrofluidic device of claim 1, wherein the second electrode has a switching device to control a driving voltage of the second electrode.

6. The electrofluidic device of claim 1, wherein the groove structure layer is insulating material.

7. The electrofluidic device of claim 6, wherein the groove structure layer further comprises a third electrode.

8. The electrofluidic device of claim 7, wherein the groove structure layer has a dielectric layer on the third electrode.

9. The electrofluidic device of claim 8, wherein the groove structure layer has a hydrophobic layer on the dielectric layer.

10. The electrofluidic device of claim 1, wherein a duct is located at a periphery of the groove structure layer.

11. The electrofluidic device of claim 1, wherein the groove structure layer has a thickness to form a space for the indent groove to contain a sufficient amount of the polar fluid, so that when the polar fluid is driven out to the gap, the polar fluid can fully extend to the gap.

12. The electrofluidic device of claim 1, wherein the first electrode is at a ground voltage, the second electrode drives the polar fluid according to a voltage signal applied.

13. An electrofluidic display panel, comprising:
    a first structure layer, comprising:
        a first substrate;
        a plurality of first electrodes, disposed on the first substrate to form an array;
        a plurality of second electrodes, disposed on the first substrate corresponding to the first electrodes, wherein each of the second electrodes has an indent region surrounding a corresponding one of the first electrodes without contact; and
        a plurality of first hydrophobic layers, respectively at least disposed on the second electrodes;
    a second structure layer, located at one side of the first structure layer, and separating by a gap, the second structure layer comprising:
        a second substrate;
        a plurality of groove structure layers, disposed on the second substrate corresponding to the second electrodes, wherein each of the groove structure layers has an indent groove, corresponding to one of the indent regions of the second electrode; and
        a plurality of second hydrophobic layers, respectively disposed on the groove structure layers;
    a plurality of polar fluids, each of the polar fluids is respectively disposed a corresponding one of the indent grooves, and remaining contact with a corresponding one of the first electrodes; and
    a non-polar fluid, disposed in the gap between the first structure layer and the second structure layer, and forming a fluid interface with the polar fluid.

14. The electrofluidic display panel of claim 13, wherein a dielectric layer is disposed between the second electrodes and the first hydrophobic layers.

15. The electrofluidic display panel of claim 13, wherein the second electrodes are patterned electrode layers.

16. The electrofluidic display panel of claim 13, wherein the second electrodes respectively have a plurality switching devices to respectively control a driving voltage of the second electrodes.

17. The electrofluidic display panel of claim 13, wherein each of the groove structure layer comprises:
    a bottom insulating layer; and
    a third electrode, disposed between the bottom insulating layer and the second hydrophobic layer.

18. The electrofluidic display panel of claim 13, wherein a periphery of the groove structure layer is a duct.

19. The electrofluidic display panel of claim 13, wherein the groove structure layers have a thickness to form a space for each of the indent grooves to contain a sufficient amount of each of the polar fluids, so that when each of the polar fluids is driven out to the gap, each of the polar fluids can fully extend to the gap.

20. The electrofluidic display panel of claim 13, wherein the first electrodes are at a ground voltage, the second electrode drives the polar fluid according to a voltage signal applied.

21. An operation method for electrofluidic device, wherein an electrofluidic device comprises:
    a first structure layer, comprising:
        a first substrate;
        a first electrode, disposed on the first substrate;
        a second electrode, disposed on the first substrate, wherein the second electrode has an indent region surrounding the first electrode without contact; and
        a first hydrophobic layer, disposed on the second electrode;
    a second structure layer, located at one side of the first structure layer, and separating by a gap, the second structure layer comprising:
        a second substrate;
        a bottom insulating layer, disposed on the second substrate, wherein the bottom insulating layer has an indent groove corresponding to the indent region of the second electrode;
        a third electrode, disposed on the bottom insulating layer;
        a second hydrophobic layer, disposed on the third electrode; and
    a polar fluid, disposed in the indent groove and remaining a contact with the first electrode and having a variable contact area with the first hydrophobic layer and the second hydrophobic layer; and
    a non-polar fluid, disposed in the gap between the first structure layer and the second structure layer, and forming a fluid interface with the polar fluid,
    the operation method comprising:
    applying a ground voltage to the first electrode;
    applying a first voltage signal to the second electrode, wherein the first voltage signal is alternatively changing between a first positive voltage and a first negative voltage by a frequency; and
    applying a second voltage signal to the third electrode, wherein the second voltage signal is alternatively changing between a second positive voltage and a second negative voltage by the same frequency.

22. The operation method of claim 21, wherein when at a non-display state, the first voltage signal and the second voltage signal stop applying.

23. The operation method of claim 21, wherein the second electrode has a switching device, the switching device receives a switching signal to conduct or disconnect the first voltage signal.

* * * * *